US010690745B2

(12) United States Patent
Robinson et al.

(10) Patent No.: US 10,690,745 B2
(45) Date of Patent: Jun. 23, 2020

(54) METHODS AND SYSTEMS FOR PULSE ASSOCIATION OF AGILE EMITTERS

(71) Applicant: Raytheon Company, Waltham, MA (US)

(72) Inventors: Ian S. Robinson, Waltham, MA (US); Stanley I. Tsunoda, Waltham, MA (US); Bradley A. Flanders, Waltham, MA (US)

(73) Assignee: Raytheon Company, Waltham, MA (US)

( * ) Notice: Subject to any disclaimer, the term of this patent is extended or adjusted under 35 U.S.C. 154(b) by 261 days.

(21) Appl. No.: 15/955,987

(22) Filed: Apr. 18, 2018

(65) Prior Publication Data

US 2019/0324107 A1    Oct. 24, 2019

(51) Int. Cl.
  *G01S 3/48* (2006.01)
  *G01S 13/88* (2006.01)
  *G01S 7/02* (2006.01)
  *G01S 13/933* (2020.01)

(52) U.S. Cl.
  CPC ............. *G01S 3/48* (2013.01); *G01S 7/021* (2013.01); *G01S 13/883* (2013.01); *G01S 13/933* (2020.01)

(58) Field of Classification Search
  CPC ... G01S 3/48; G01S 3/46; G01S 3/043; G01S 3/023; G01S 5/06; G01S 13/883; G01S 13/933
  USPC ........................................................ 342/442
  See application file for complete search history.

(56) References Cited

U.S. PATENT DOCUMENTS

| | | | |
|---|---|---|---|
| 5,724,047 A | 3/1998 | Lioio et al. | |
| 6,313,794 B1 | 11/2001 | Rose | |
| 7,961,147 B1 | 6/2011 | Vanlaningham et al. | |
| 9,523,761 B1 * | 12/2016 | Hoffmann | G01S 5/06 |
| 2011/0068223 A1 * | 3/2011 | Zahavi | F41J 9/08 244/1 TD |
| 2017/0242092 A1 | 8/2017 | Marquez et al. | |

OTHER PUBLICATIONS

International Search Report and Written Opinion from related PCT Application No. PCT/US2018/049188 dated Dec. 12, 2018.

* cited by examiner

*Primary Examiner* — Harry K Liu
(74) *Attorney, Agent, or Firm* — Burns & Levinson, LLP; Joseph M. Maraia

(57) ABSTRACT

An advance warning system including an antenna pair and an RWR system to receive first, second and third signals for computing a frequency for all the signals and a phase difference between the signals. If the frequencies are within a threshold frequency difference and the phase difference is less than a threshold phase difference, two signals can be associated. If the frequencies are not within the threshold frequency difference, the RWR system generates a set of ambiguous angle of arrival AoA for the signals and correlates the two sets of ambiguous AoA to determine if there is a common AoA. If there is a common AoA, a third set of ambiguous angle of arrival AoA for a third signal is generated to determine if the three sets correlate. If there is a common AoA for all three signals, the three signals are associated.

6 Claims, 9 Drawing Sheets

METHODS AND SYSTEMS FOR PULSE ASSOCIATION OF AGILE EMITTERS

BACKGROUND

1. Technical Field

This application relates to electronic support and radar warning systems and, more particularly, for electronic support and radar warning systems on tactical aircraft to detect threats that are radar emitters.

2. Discussion of Related Art

Electronic Support (ES) and Radar Warning Receiver (RWR) systems have an increasing need to precisely identify potential threats including waveform and frequency agile emitters, as accurately and rapidly as possible. To identify distinct threats when many emitters are present requires that the RWR associate pulses with each emitter. For emitters that change waveform and/or frequency this may be challenging.

For pairs of antennas spaced many wavelengths apart, phase interferometry (PI) is capable of highly precise angle of arrival (AoA) measurements with less than 1° error. However, there are 2D/lambda possible AoAs (where D is the antenna separation and lambda the transmitter wavelength), which creates an ambiguous result for each pulse. Antennas spaced less than one-half wavelength apart have no ambiguities but less precise AoA measurements.

Time Difference of Arrival (TDOA) direction finding may be used to compute AoA over a span of 180° without ambiguity. The time delay between two antennas is monotonic with respect to geometric angle changing from 0 to 90 degree (and conversely from −90 to 0), but TDOA provides relatively low AoA precision. Amplitude comparison direction finding generally provides a similarly coarse AoA precision. Improved AoA precision may be achievable using Frequency Difference of Arrival (FDOA) techniques, however FDOA techniques require stable emitter signal frequencies for long periods of time (e.g., 10ths of seconds, seconds, or many seconds depending on platform velocity and desired AoA precision), thus limiting the number of threats that can be simultaneously geolocated and limiting applicability to threats with a constant frequency. In comparison, an interferometer can provide precision AoA in a single pulse time (e.g., microseconds to milliseconds.)

U.S. Pat. No. 5,724,047 issued on Mar. 3, 1998 to Lioio teaches a precise direction finding system making use of single pulses and TDOA and phase interferometry (PI). The method disclosed therein was directed to low frequencies (large wavelengths), and operates on an assumption that the correct PI AoA solution is the one closest to (the single, coarse) TDOA AoA. However, for antenna spacing of greater than 1.5 times the received wavelength, where three or more ambiguities exist, the AoA solution provided by that technique is more likely to be incorrect than correct. Moreover, that technique does not address the use of multiple pulses, or contemplate frequency agile emitters.

U.S. Pat. No. 6,313,794 issued on Nov. 6, 2001 to Rose teaches a method of associating a single pulse from an agile emitter with previously detected pulses from that emitter in a time interval less than the pulse repetition interval (PRI) of the radar. Ambiguous phases from the previously detected pulses from the same agile emitter are stored. A single cos(aoa) from a subset of the stored ambiguous phases is estimated. A new ambiguous phase $\varphi_m$ at frequency $f_m$ is detected. This frequency is different from at least one of the frequencies associated with the phases in the stored set. The phase measurement is made between two antennas spatially separated by distance d. A set of differenced phases is formed and corresponding differenced frequencies from the stored set, with at least one member of this set being the difference of the new ambiguous phase and frequency with one of the stored phases and its associated frequency. The phase cycle measurement ambiguity integer is measured resolving the phase difference formed from the new ambiguous phase utilizing this set of phase and frequency differences. The phase cycle measurement ambiguity integer is computed resolving the new ambiguous phase difference if the new pulse is from the same emitter as the stored set by utilizing the previously estimated cos(aoa) and newly measured frequency $f_m$. The measured and computed ambiguity integers are compared. The newly detected pulse is associated with the previously stored pulses as being from the frequency agile emitter if the integers are equal.

U.S. Pat. No. 6,411,249 issued on Jun. 25, 2002 to Rose teaches using feedback from RF carrier frequency measurements to disassociate the emitter angle-of-arrival component in the ambiguous phase measurement from the initially unknown phase measurement integer ambiguities; to then resolve the ambiguities; and finally to obtain the correct emitter AOA. U.S. Pat. No. 6,411,249 discloses converting the actual interferometer baselines on which the unassociated pulse phase measurements were made at different emitter frequencies to a baseline set for a single-frequency equivalent interferometer array. This conceptual array has the following property: the phase measurement that would be made on it at the fixed frequency for a signal at the same direction-of-arrival are identical to the actual phase measurements made on the physical array. Because of this equivalency, the conceptual array is called the E(equivalent)-array. But, whereas the physical array has antenna spacings that are invariant, the E-array "antenna" spacings change as a function of the RF carrier frequency measurement feedback, which depends on the particular residual pulses being tested. Thus, there is a different E-array, even for the same frequency agile emitter, depending on the particular residual pulse set used.

SUMMARY

In view of the above, systems and methods of associating pulses which come from the same emitter, whether or not the emitter is frequency agile, without the aforementioned drawbacks would be beneficial. For example, an association method is desired that can quickly find which pulses are received from each emitter, including frequency agile emitters, across a broad range of frequencies. It would also be desirable to determine which pulses are not associated with an emitter and may be thinned from the analysis of that emitters characteristics. Further, it would be additionally desirable to provide such improved association to antenna systems already existing on many types of aircraft.

Association and thinning systems and methods are described for multiple RF signals (e.g., signal pulses) relative to a system antenna array upon which the signal(s) are incident. In one embodiment, pairs of antenna elements (e.g. the antennas deployed on many aircraft) are employed for emitter identification.

In one embodiment, a method is provided for determining which pulses are received at an antenna pair from each of multiple emitters, such as a frequency agile and/or non-agile emitters.

In another embodiment, the subject technology is directed to an advance warning system for detecting threats to a tactical aircraft including an antenna pair assembly mounted on the tactical aircraft including: an antenna pair including first and second antenna elements/receivers for detecting: a first signal/pulse related to a potential threat, the first signal/pulse being at a first wavelength and a first frequency, wherein the first and second antenna elements are spaced apart by more than one half of the first wavelength; and a second signal/pulse at a second wavelength and a second frequency. An RWR system is in communication with the antenna pair assembly to receive the first and second signals/pulses, and configured to: compute a phase difference between the first and second antenna elements/receivers for the both signals/pulses; compute a frequency for both signals/pulses; optionally compute an angle of arrival based using coarse AoA determination method, such as a time difference of arrival (TDOA) between each signal/pulse arriving at the first and second antenna elements/receivers; and compute a set of ambiguous angle of arrivals for each signal/pulse based on the frequency and phase difference arriving at the first and second antenna elements/receivers. If the frequency and phase difference of the first and second signals/pulses match, the RWR system associates the second signal/pulse with the first signal/pulse.

If the first and second frequency do not match, the RWR system determines a set of ambiguous AoAs for each signal/pulse, then the RWR system correlates the set of possible ambiguous AoAs for each signal/pulse to determine if the first and second signals/pulses have a common AoA, if so the first and second signals/pulses can be associated. Alternatively, the set of possible AoA can be described as a probability distribution and the distributions of probability of the first and second signals/pulses can be multiplied to yield a resultant score that is evaluated to determine if any AoA has a joint probability high enough to associate the first and second signals/pulses. Optionally, to reduce false associations in the case of different frequencies of the two pulses, one can consider a $3^{rd}$ pulse to see if the association of the two previous pulses was based on a coincidental overlap of emitters in different places, at different frequencies that happened to have a common ambiguous AoA.

Another embodiment of the subject technology is directed to an advance warning system for detecting threats to a tactical aircraft including an antenna pair assembly mounted on the tactical aircraft including: an antenna pair including first and second antenna elements/receivers for detecting: a first signal/pulse related to a potential threat, the first signal/pulse being at a first wavelength and a first frequency, wherein the first and second antenna elements are spaced apart by more than one half of the first wavelength; and a second signal/pulse at a second wavelength and a second frequency. An RWR system is in communication with the antenna pair assembly to receive the first, second and third signals/pulses, and configured to: compute a phase difference between the first and second antenna elements/receivers for the first signal/pulse; compute a first angle of arrival based on a time difference of arrival (TDOA) between the first signal/pulse arriving at the first and second antenna elements/receivers; and compute a second angle of arrival for the first signal/pulse. If the frequency and phase difference of the first and second signals/pulses match, the RWR system associates the second signal/pulse with the first signal/pulse.

If the first and second frequency do not match, the RWR system utilizes sets of ambiguous AoA to determine if the first and second signals/pulses should be associated. The RWR system also can apply a TDOA test that determines if the third signal/pulse has TDOA3−TDOA1<TDOAe. If the third signal/pulse passes the TDOA test, the RWR system discerns whether there is an agile emitter or a second emitter at a fortuitous frequency and AoA that produces a false match by comparing ambiguous AoA sets of the two associated signals/pulses (e.g., the first and second signals/pulses) with the third signal/pulse. If only one answer is within a user set threshold (T1) for all three pulses, then there is an agile emitter at the AoA of the common AoA. If the frequency is different on all three pulses, the emitter is a pulse-agile emitter; and if there is no common answer, the third pulse can be removed or pruned.

In another embodiment, precise direction finding systems are provided including an antenna array comprising any two spaced apart antenna array elements and one or more signal processors for determining highly accurate AoA estimates for one or more RF signals. The systems may implement any of the methods described above. The signal processor(s) might include angle calculation means responsive to the phase difference and frequency values for performing a PI determination of the set of ambiguous PI estimates of the AoA. The angle calculation means may further perform the TDOA angle calculation to provide a coarse estimate(s) of the AoA. If TDOA angle calculations or any other coarse methods of AoA determination are available, such methods may be used to limit the span of the ambiguous set of possible AoA from phase interferometry that are compared to look for a common AoA.

Still another embodiment of the subject technology is directed to an advance warning system for detecting threats to a tactical aircraft comprising: an antenna pair assembly mounted on the tactical aircraft including: an antenna pair including first and second antenna elements/receivers for detecting: a first signal/pulse related to a potential threat, the first signal/pulse being at a first wavelength and a first frequency, wherein the first and second antenna elements are spaced apart by more than one half of the first wavelength; a second signal/pulse at a second wavelength and a second frequency; and a third signal/pulse at a third wavelength and a third frequency; an RWR system in communication with the antenna pair assembly to receive the first, second and third signals/pulses, and configured to: compute a frequency ($f_n$) for the first, second and third signals/pulses; compute a phase difference ($\Delta\varphi_{diff}$) between the first and second antenna elements/receivers for the first and second signals/pulses; if the first and second frequency are within a threshold frequency difference ($f_e$) and the phase difference is less than a threshold phase difference ($\Delta\varphi_{diff}$), associate the second signal/pulse with the first signal/pulse; if the first and second frequency are not within a threshold frequency difference ($f_e$), generate a set of ambiguous angle of arrival AoA for the first and second signals/pulses based on the frequency and the phase difference of the first and second signals/pulses; correlate the two sets of ambiguous AoA to determine if there is a common AoA, if there is a common AoA, generate a third set of ambiguous angle of arrival AoA for the third signal/pulse based on the frequency and the phase difference of the third signal/pulse; correlate the three sets of ambiguous AoA to determine if there is a common AoA for all three signals/pulses; and if there is a common AoA for all three signals/pulses, associate all three signals/pulses.

Such an advance warning system may also be configured to correlate the two sets of ambiguous AoA to determine if there is a common AoA, a common AoA is when a difference between the AoA for the first pulse/signal and the AoA for the second pulse/signal is below a user selected error threshold ($AoA_e$). The RWR system is further configured to determine a difference ($TDOA_{diff}$) between a Time Difference of Arrival ($TDOA_2$) for the second pulse/signal and a Time Difference of Arrival ($TDOA_1$) for the first pulse/signal, wherein if $TDOA_{diff}$ is not less than a threshold TDOA difference ($TDOA_e$), no association of the first and second signals/pulses occurs. Preferably, to generate a set of ambiguous angle of arrival AoA for the first and second signals/pulses based on the frequency and the phase difference of the first and second signals/pulses, the sets are constrained by Time Difference of Arrival (TDOA) bounds. To correlate the two sets of ambiguous AoA to determine if there is a common AoA, the RWR system: defines a probability distribution (Prob(AoA)) for each AoA of the first and second signals/pulses; multiplies the two probability distributions to yield a probability distribution product; and evaluates the probability distribution product to determine if the probability distribution product has any angles with joint probability greater than a probability distribution threshold $Prob_e$ to determine if there is a common AoA between the first and second signals/pulses. In one embodiment, the first signal is received from an RF emitter.

Such systems may comprise an integral component of, or provide AoA information to, Electronic Support (ES) and/or Radar Warning Receiver (RWR) systems (e.g., in the form of pulse descriptor words and/or emitter descriptor words.) As shown in FIG. 1, the direction finding system may comprise a software or firmware retrofit to upgrade legacy ES or RWR systems using existing antenna elements 10a-10d configured at widely spaced stations, for example, on wings 12, nose 14 and/or tail 16 of an aircraft 18. These positions may allow the simplest physical installation, provide the best unobstructed field of view around the platform.

These and other features and advantages of the systems and methods will be apparent from this disclosure. It is to be understood that the summary, drawings, and detailed description are not restrictive of the scope of the inventive concept described herein.

BRIEF DESCRIPTION OF THE DRAWING

In the illustrations of the accompanying figures, like components may be given the same reference characters, regardless of whether they are shown in different examples. The illustrations of various elements are not necessarily to scale, emphasis instead being placed upon illustrating the principles of the examples. Various views are provided, and reference may be had to the following figures.

DETAILED DESCRIPTION

In the following description, numerous specific details are set forth. In the other instances, details well known to those skilled in the art may not be set out so as not to obscure the disclosed embodiments. It will be apparent to those skilled in the art in the view of this disclosure that modifications, substitutions and/or changes may be made without departing from the scope and spirit of the embodiments. The RF signals that are described in the following exemplary embodiments may be referred to as pulsed signals and/or pulses; however this is by no means intended to limit the scope of the disclosure to such signals. As used herein, the term signal may refer to a pulsed or continuously transmitted waveform originating at an emitter but it is noted that interchangeability of such terms exists. In the case that the emitter emits pulsed signals, some or all of a pulse may be received and processed. In the case of a continuous wave signal, the signal may be received for an initial and subsequent intervals. For illustration, the following description refers to pulsed signals.

In brief overview, the subject technology enhances performance of Electronic Support (ES) and/or Radar Warning Receiver (RWR) systems. In particular, the subject technology is useful for identifying each possible threat amidst a plurality of agile emitters. For example, signals from possible threats and other sources can be associated or thinned so that useful information can be more quickly and accurately determined to enhance safety. U.S. patent application Ser. No. 15/492,694 filed Apr. 20, 2017 discloses finding methods and systems using interferometric time delay of arrival and is expressly incorporated herein by reference.

Figure 1:
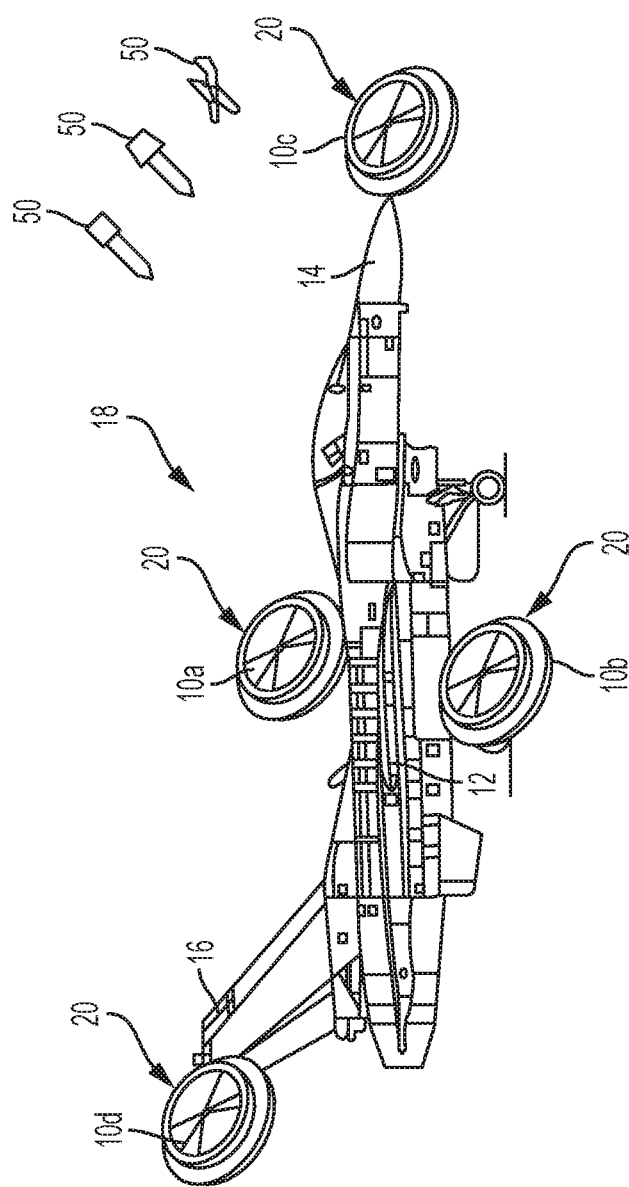
FIG. 1 is an illustration of an exemplary aircraft configured with multiple antenna elements for receiving emitter RF signals from possible threats such as a surface-to-air-missile in accordance with the subject technology.

In one application, the subject technology is deployed on an aircraft 18 such as shown in FIG. 1. The subject technology may be integral to the aircraft 18 upon initial assembly or a firmware retrofit to upgrade legacy ES or RWR systems. The aircraft 18 has an antenna assembly 20 that may include one or more pairs of antenna elements 10a-10d, which are not drawn to scale for illustration. The antenna elements 10a-10d are preferably widely spaced on the aircraft 18. For example, the antenna elements 10a-10d are on wings 12, nose 14 and/or tail 16 of the aircraft 18. These positions may allow the simplest physical installation, and provide the best unobstructed field of view. The antenna elements 10a-d are separated by a distance s, which is typically many meters. The aircraft 18 also includes a RWR system 100 that communicates with the antenna assembly 20 to provide identification of threat emitters 50 such as surface-to-air-missiles (SAM), other airplanes, ground structures, and the like.

Figure 2:
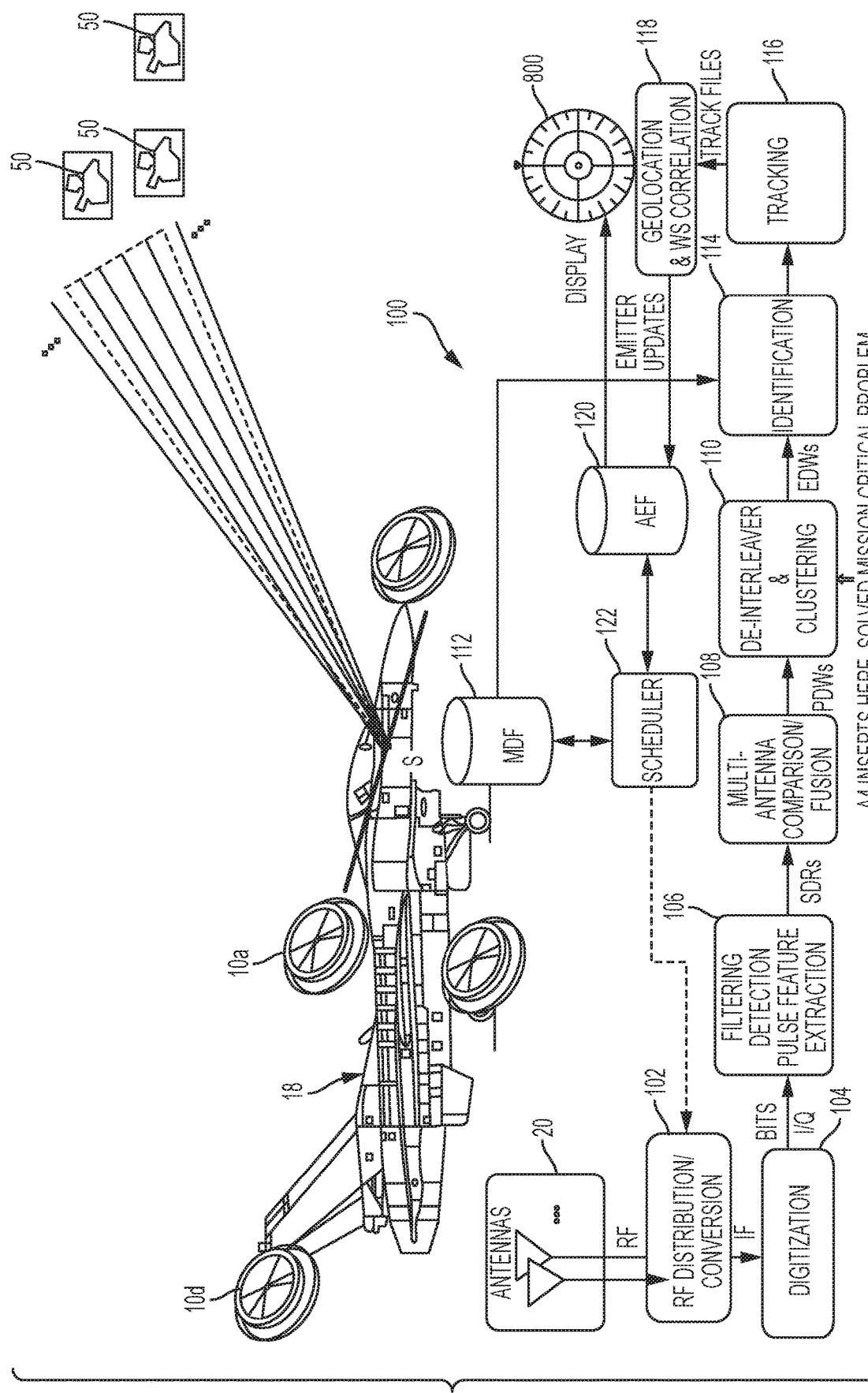
FIG. 2 is a functional block diagram of an exemplary system for improved identification of threat emitters in accordance with the subject technology.

Referring now to FIG. 2, a functional block diagram of an exemplary RWR system 100 for improved identification of multiple frequency agile threat emitters in accordance with the subject technology is shown. It is envisioned that a large variety of different hardware and software configurations can adequately implement the subject technology. For example, the RWR system 100 may include multiple signal processors implemented in hardware, firmware, as one or more computer programs having computer-executable instructions or code running on one or more computers, or as any combination thereof. One or more users can interface with the RWR system 100 using any suitable display (e.g., screens in a cockpit, CRT screens, televisions, computer monitors, laptops, tablets computing device, smart phones, personal digital assistant (PDAs) and/or other displays and computing devices, etc.). Typically, the RWR system 100 and the users (e.g., pilots, navigators and the like) are co-located in the aircraft 18. Of course, users may also be located remotely from the aircraft 18 (e.g., a drone) and the RWR system 100. The RWR system 100 preferably includes processors with common local oscillators (LO) with a low noise LO/clock. Wide band antenna are preferred so that the subject technology works over very wide bandwidths. In one embodiment, the frequency dependent phase errors are calibrated.

Figure 3:
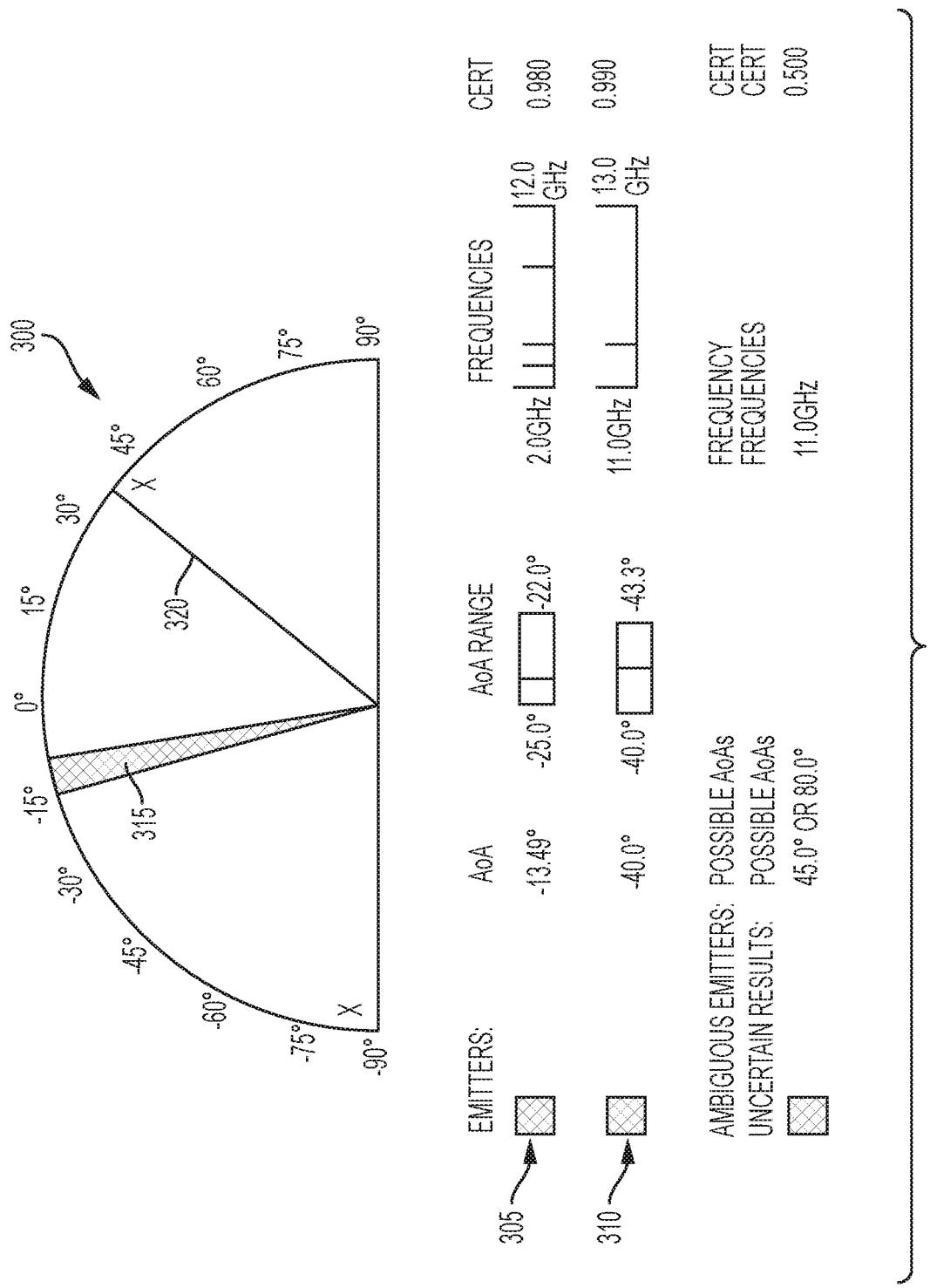
FIG. 3 is an exemplary graphical user interface displaying multiple sets of emitter data in accordance with the subject technology.

An exemplary user interface 300 is illustrated in FIG. 3. User interface 300 may provide information for display, such as real-time display of multiple emitter data 305, 310 and AoA plots 315, 320.

In certain embodiments, the antenna elements 10a-d may comprise directional antennas having known gain patterns that are configured to point in different directions. Amplitude comparison direction finding techniques may be employed, in addition to TDOA and PI direction finding techniques, to further adjust the TDOA error boundary pulse signals.

Still referring to FIG. 2, the RWR system 100 includes a plurality of modules. A module is a functional aspect, which may include software and/or hardware. Typically, a module encompasses the necessary components to accomplish a task. It is envisioned that the same hardware could implement a plurality of modules and portions of such hardware being available as needed to accomplish the task. Those of ordinary skill will recognize that the software and various processes discussed herein are merely exemplary of the functionality performed by the disclosed technology and thus such processes and/or their equivalents may be implemented in different embodiments in various combinations without materially affecting the operation of the disclosed technology.

The RWR system 100 receives data from the antenna assembly 20 into an RF distribution/conversion module 102. The RWR system 100 also includes a digitization module 104, a multi-antenna comparison/fusion module 108, a de-interleaver and clustering module 110, an identification module 114, a tracking module 116, a mission data file (MDF) module 112, a geolocation and WS correlation module 118, an AEF module 120, and a scheduler module 122.

The RWR system 100 can calculate a plurality of parameters including a precision angle of arrival (AoA) estimate of pulse signals incident on the antenna elements 10a-d. Hence, although not shown in FIG. 2 explicitly, the RWR system 100 can calculate such as well as a probability intercept (PI), a time difference of arrival (TDOA), a phase difference, ratios and the like as needed to accomplish the systems and methods described herein.

The flowcharts herein illustrate the structure and the logic of the present technology, possibly as embodied in an RWR system, which may include computer program software for execution on a controller computer, digital processor or microprocessor. Those skilled in the art will appreciate that the flow charts illustrate the structures and functions of the elements, including what may be logic circuits on an integrated circuit, that function according to the present technology. As such, the present technology may be practiced by machine components that render flowchart steps in a form that instructs the RWR system to perform a sequence of function steps corresponding to those shown in the flow charts.

Figure 4:
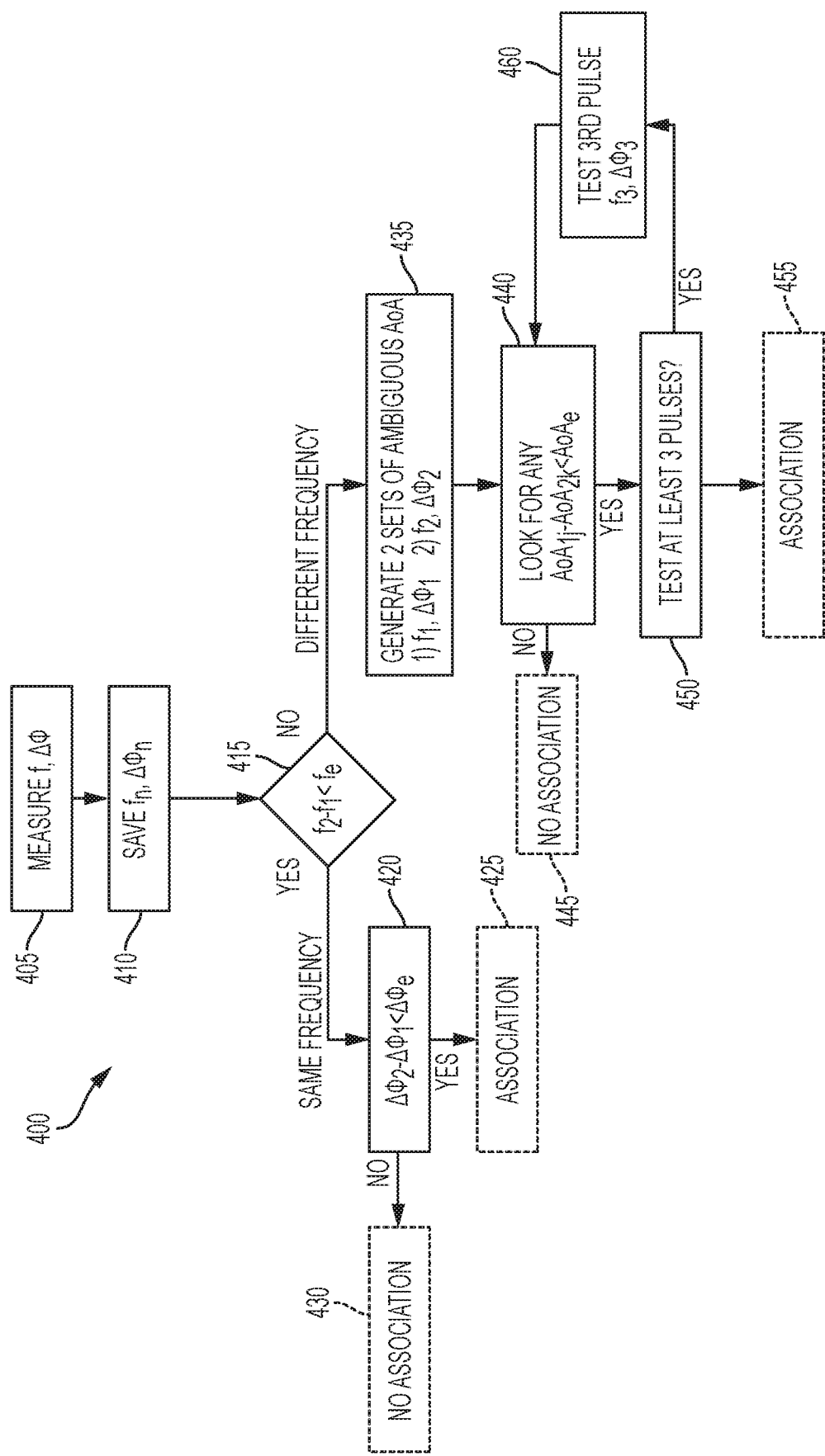
FIG. 4 is a flow diagram of an exemplary method for improved association of pulses based on ambiguous angle of arrival in accordance with the subject technology.

Referring now to FIG. 4, a flow diagram illustrating a method 400 of associating pulses based on ambiguous angle of arrival using the RWR system 100 is shown. The RWR system 100 and antenna elements 10a-d capture a plurality of pulses from multiple frequency constant and frequency agile emitters 50. The RWR system 100 may use signals from all of the antenna elements 10a-d or a subset such as antenna elements 10a, 10b in the following example. The method 400 does not utilize assistance from coarse AoA but does set union ambiguous AoA test.

At step 405, signals are received at the two antenna elements 10a, 10b. The antenna elements 10a, 10b feed the signals to the RWR system 100. For each pulse, the RWR system 100 measures the frequency (f) and phase difference ($\Delta\varphi$). The RWR system 100 may also measure the Time Difference of Arrival (TDOA). Processing of the pulses can determine other signal features such as times of arrival (TOA), peak amplitude (A), TDOA error ($T_{err}$), geometric angle of arrival (AoA) and the like. The TDOA may be measured using leading edge envelope detection for simple pulsed signals, and pre-detection correlation for phase and frequency modulated signals. The TDOA error ($T_{err}$) is the angle error in the TDOA measurement.

At step 410, a first pulse from a potential threat is identified and processed to store the frequency $f_1$ and phase difference $\Delta\varphi_1$. A second pulse is also identified and processed to store a respective frequency $f_2$ and phase difference $\Delta\varphi_2$.

At step 415, the RWR system 100 determines a difference ($f_{diff}$) between the frequency $f_2$ and frequency $f_1$. If $f_{diff}$ is less than a threshold frequency difference ($f_e$), the method 400 proceeds to step 420. If $f_{diff}$ is more than a threshold frequency difference ($f_e$), the method 400 proceeds to step 435.

At step 420, a phase difference ($\Delta\varphi_{diff}$) between the phase differences $\Delta\varphi1$, $\Delta\varphi2$ is determined. In other words, the phase differences $\Delta\varphi_1$, $\Delta\varphi_2$ are compared directly to decide if the pulses associate. If the phase difference $\Delta\varphi_{diff}$ is less than a threshold ($\Delta\varphi_e$), then the RWR system 100 associates the pulses at step 425. If the phase difference $\Delta\varphi_{diff}$ is more than the threshold ($\Delta\varphi_e$), then the RWR system 100 does not associate the pulses at step 430.

Returning to step 415, where the method 400 may proceed to step 435, the RWR system 100 generates two sets of ambiguous AoA. The first set of ambiguous AoA ($AoA_{1,j}$) is based on frequency f1 and phase difference $\Delta\varphi_1$ of the first pulse. The second set of ambiguous AoA ($AoA_{2,k}$) is based on frequency $f_2$ and phase difference $\Delta\varphi_2$ of the second pulse.

At step 440, the RWR system 100 evaluates the sets of ambiguous AoA ($AoA_{1,j}$, $AoA_{2,k}$) to determine if there are any common angles. A common angle is any angle from set J and set K whose difference is below a user selected error threshold ($AoA_e$). If the sets of ambiguous AoA ($AoA_{1,j}$, $AoA_{2,k}$) have no common members, then the method 400 proceeds to step 445 and the RWR system 100 does not make any associations. For the sets of ambiguous AoA (AoA$_{1,j}$, AoA$_{2,k}$) that have a common member, then the method 400 proceeds to step 450.

At step 450, the RWR system 100 reduces false associations by testing additional pulses. If the number of associated pulses is less than three, the method 400 proceeds to step 460 to test additional pulses. At step 460, another pulse (e.g., a third pulse) is tested and the method 400 loops back to step 440. If no other pulse associates with the pair of pulses with different frequencies and a common angle, the association is removed by proceeding to step 445. If the association is verified with a third pulse, then the method 400 proceeds to step 455, where the pulses are associated. Thus, the false associations are reduced by repeating through steps 440, 450, 460.

Still referring to step 450, the RWR system 100 may reduce false associations by correlating the comb of ambiguous AoAs with the current comb when the two frequencies of the pulses are different. Such a correlation is shown graphically in FIGS. 5A and 5B, which are graphs of probability versus AoA in degrees for the first and second pulses, respectively. As can be seen from FIGS. 5A and 5B, the delta phase $\Delta\varphi$ of widely spaced antenna elements 10a, 10b results in combs, 502, 512 of multiple ambiguous AoAs, where the number of ambiguous AoAs is limited by TDOA/amplitude A direction finding (DF).

Figure 5A:
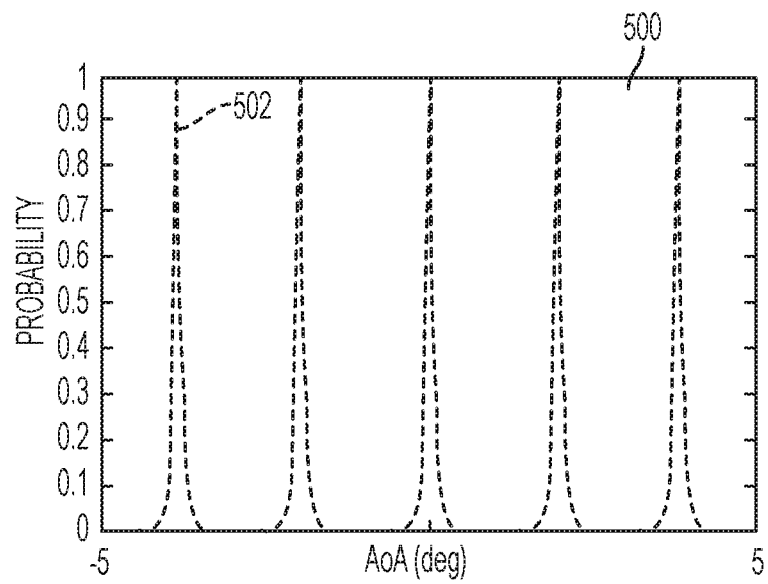
FIGS. 5A and 5B are graphs illustrating exemplary combs for first and second pulses, respectively, in accordance with the subject technology.
Figure 5B:
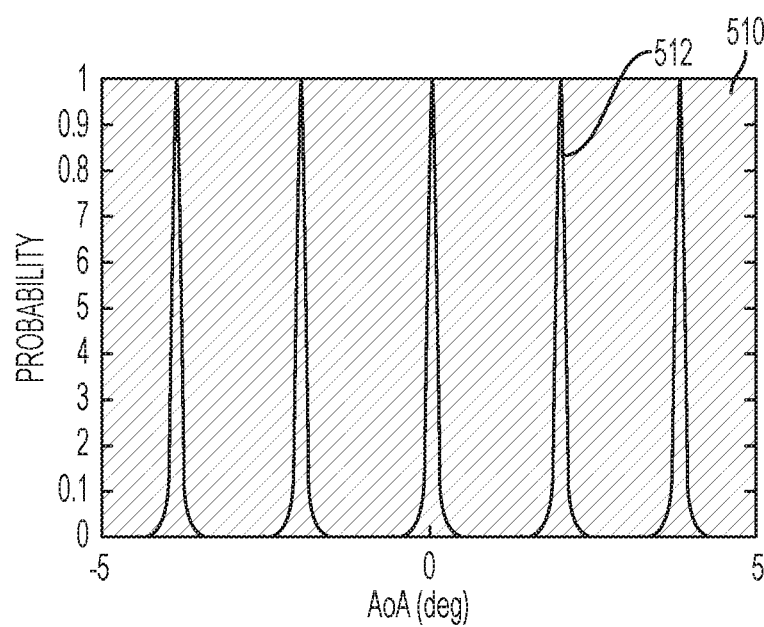

Still referring to FIGS. 5A and 5B, probability graph 500 is for the first pulse and probability graph 510 is for the second pulse. If the second pulse has the same comb as the first pulse, the potential threat emitter is probably not frequency agile and the combs/pulses can be associated as from the same emitter. The combs only need to be compared if the frequencies are of the two pulses are different. If the combs have no common angles, the emitters are different and the pulses should not be associated. This may occur when a second emitter is at a fortuitous angle and frequency.

If the comb of the second pulse has one "tooth" that matches, then the method 400 proceeds to further test the second pulse for association. The second pulse may have a matching tooth because the emitter has changed frequency (e.g., an agile emitter) or because there is another emitter at a fortuitous angle and frequency. The method 400 utilizes correlation to reject a high percentage of what would be incorrect associations, say more than 95%. Multi hypothesis can further be used to eliminate all ambiguities such as by testing three pulses from the frequency agile emitter if the frequency agile emitter is still emitting (see step 460 of method 400 as noted above). However, for the initial evaluation of two pulses, after the successful correlation at step 450 of FIG. 4, the method 400 proceeds to step 455 to make the association of the pulses.

In view of the above, it is envisioned that additional embodiments could employ additional techniques to improve the speed and/or accuracy of the analysis. For example, data thinning could be used. A PRI test could determine if pulses should be associated. The solution may then be output, with a computed pulse repetition interval (PRI), graphically as shown in FIG. 3. Fading memory and/or explicit motion compensation over long intervals could be used to update TDOA and interferometric AoA error function.

Pulse repetition frequencies (PRFs) from typical emitters are on the order of $10^3$ to $10^5$ pulses per second. Embodiments of the disclosed methods may collect 1 to several hundreds of pulses, so acquisition times may be on the order of 10s to 100s of microseconds. Signals at a lower carrier frequency may require many fewer pulses, leading to acquisition times on the order of 100s to 1000s of microseconds.

Higher frequency RF signals generate greater numbers of ambiguities. However, emitters of such higher frequency signals also tend to have higher pulse repetition rates, providing greater numbers of additional available pulse signals in a short interval for collection and analysis. Both approaches benefit by including TDOA and/or amplitude DF. Bias between AoA derived from these methods can also be removed.

Figure 6:
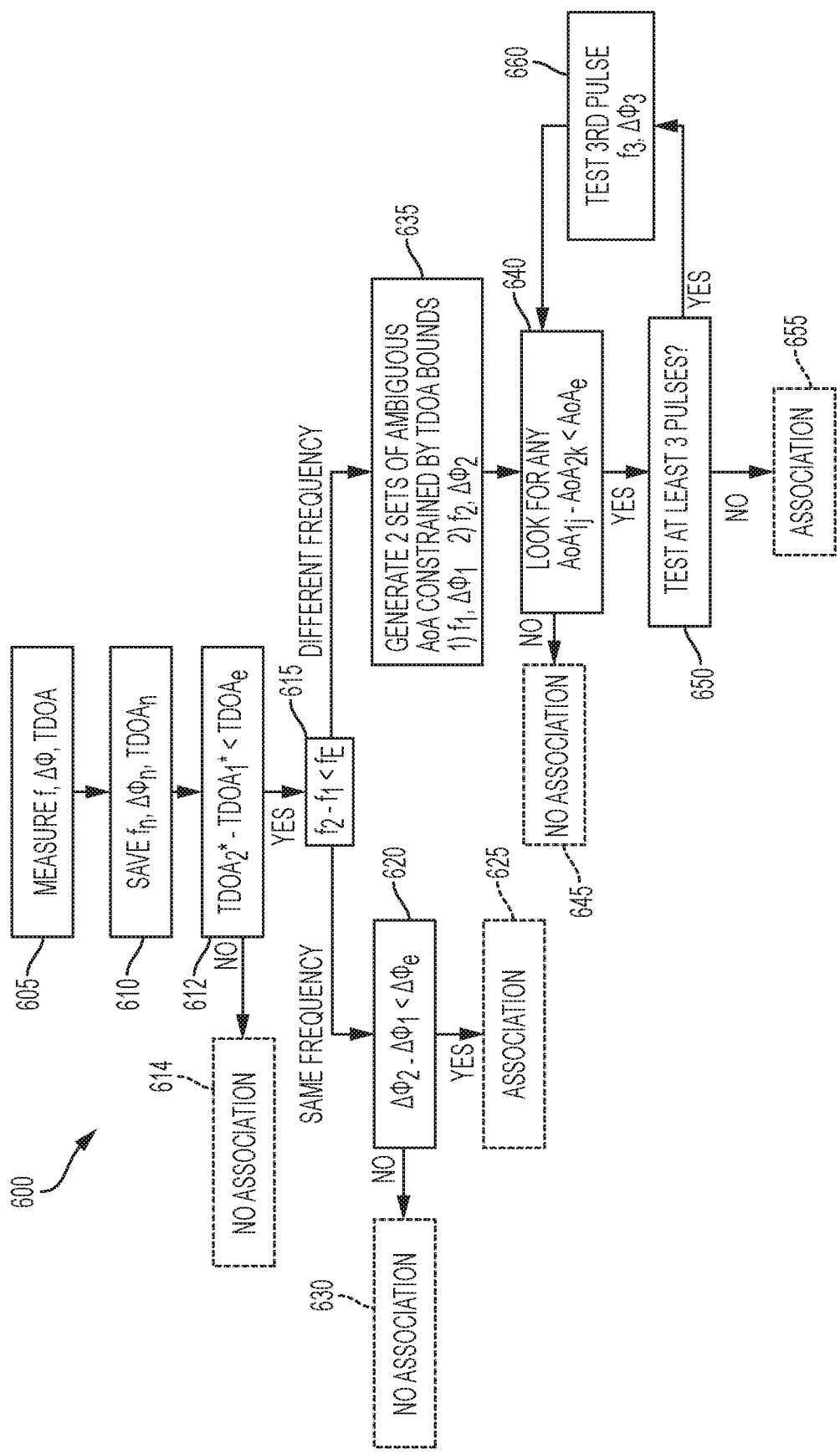
FIG. 6 is a flow diagram of an exemplary method for improved association of pulses using multiple hypothesis in accordance with the subject technology.

Referring now to FIG. 6, a flow diagram illustrating another method 600 of associating pulses based on ambiguous angle of arrival using the RWR system 100 is shown. Similar to method 400, the method 600 is performed by the RWR system 100 and antenna elements 10a-d. The method 600 does utilize assistance from coarse AoA and does set union ambiguous AoA test. For brevity, similar steps between methods 400, 600 are referenced with similar numbers so that the following description can largely focus in the distinctions between the methods 400, 600.

At step 605, the antenna elements 10a, 10b feed the signals to the RWR system 100 to measure the frequency (f), phase difference ($\Delta\varphi$) and the Time Difference of Arrival (TDOA). At step 610, pulses from potential threats are identified and processed to store the frequency $f_n$, phase difference $\Delta\varphi_n$, and TDOA$_n$ for two pulses. At step 612, the RWR system 100 determines a difference (TDOA$_{diff}$) between the TDOA$_2$ and TDOA$_1$. If TDOA$_{diff}$ is more than a threshold TDOA difference (TDOA$_e$), the method 600 proceeds to step 614 without associating the pulses. If TDOA$_{diff}$ is less than the TDOA$_e$, the method 600 proceeds to step 615.

At step 615, the RWR system 100 determines a difference ($f_{diff}$) between the frequency $f_2$ and frequency $f_1$. If $f_{diff}$ is more than a threshold frequency difference ($f_e$), the method 600 proceeds to step 635.

If $f_{diff}$ is less than a threshold frequency difference ($f_e$), the method 600 proceeds the method 600 proceeds through steps 620, 625 and 630 in a manner very similar to that described above with respect to method 400, steps 420, 425, 430.

Returning to step 615, where the method 600 may proceed to step 635. At step 635, the RWR system 100 generates two sets of ambiguous AoA constrained by TDOA bounds. In other words, when generating the sets of ambiguous AoA, as visualized in FIGS. 5A and 5B, only AoA angles closer to the TDOA angle estimate than the TDOA error estimate are considered. From step 635, the method 600 proceeds through steps 640, 645, 650, 655, 660 similarly to corresponding steps 440, 445, 450, 455, 460 of FIG. 4.

Figure 7:
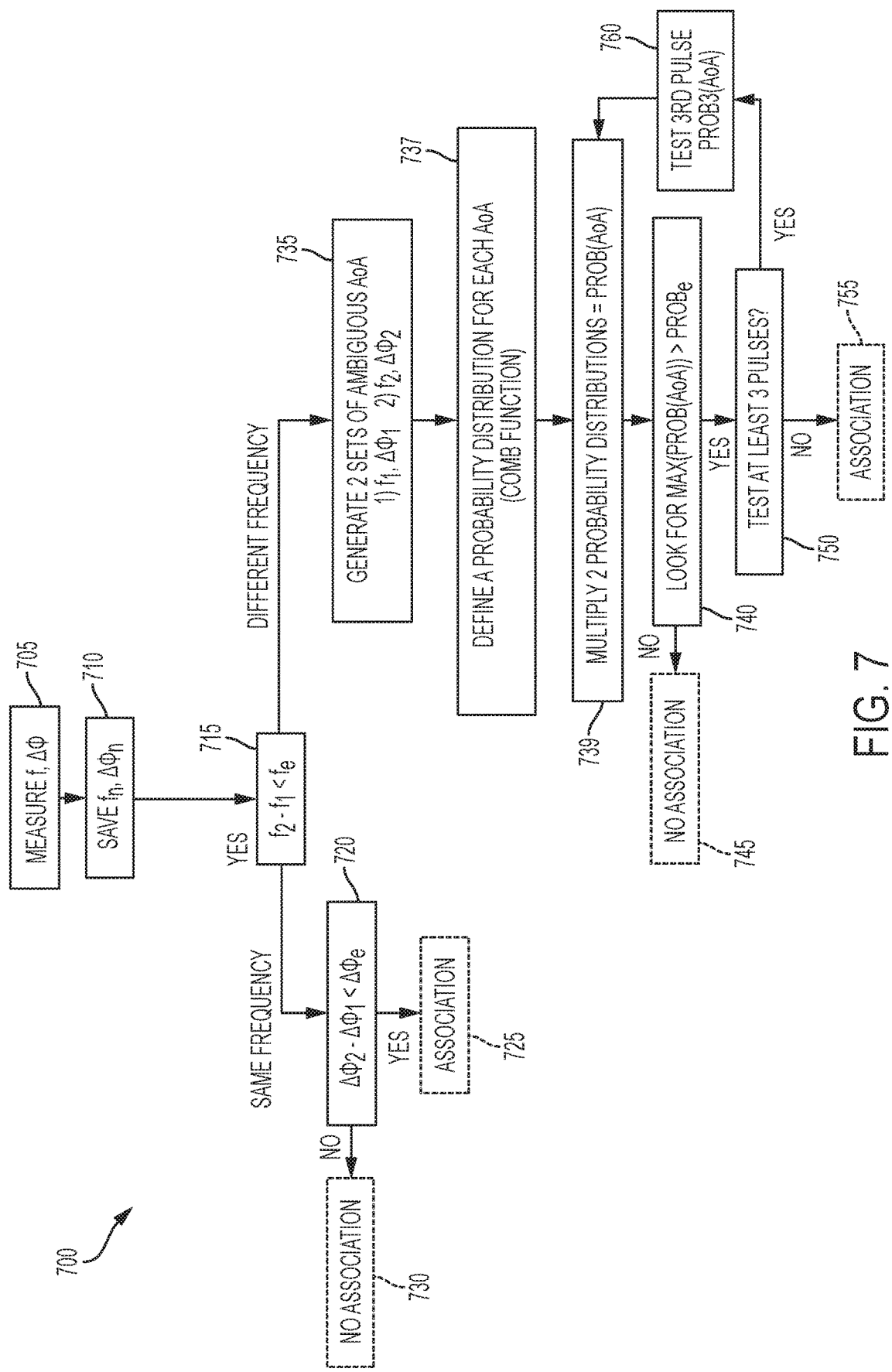
FIG. 7 is another flow diagram of an exemplary method for improved association of pulses using multiple hypothesis in accordance with the subject technology.

Referring now to FIG. 7, a flow diagram illustrating still another method 700 of associating pulses based on ambiguous angle of arrival using the RWR system 100 is shown. Similar to methods 400, 600, the method 700 is performed by the RWR system 100 and antenna elements 10a-d. The method 700 does not utilize assistance from coarse AoA but does utilize a joint probability ambiguous AoA test. Again, for brevity, similar steps between methods 400, 700 are referenced with similar numbers so that the following description can largely focus in the distinctions between the methods 400, 700. Steps 705, 710, 715, 720, 725, 730, 735 are basically the same as steps 405, 410, 415, 420, 425, 430, 435 of method 400 so that discussion in this section is omitted.

At step 737, the method 700 defines a probability distribution (Prob(AoA)) for each AoA, using a comb function, such as that shown in FIGS. 5A and 5B, to determine the probability distribution (Prob(AoA)). At step 739, the RWR system 100 multiplies the two probability distributions to yield a joint probability distribution. The resulting product, the joint probability distribution, will have peaks only where the peaks of the two probability distributions match. Then the method 700 proceeds to step 740.

At step 740, the RWR system 100 evaluates the joint probability distribution Prob(AoA) to determine if any AoA angles have a probability greater than a probability threshold $Prob_e$. If the joint probability distribution has no angles AoA with probability greater than $Prob_e$, then the method 700 proceeds to step 745 and the RWR system 100 does not make any associations. If the joint probability distribution has angles AoA with probability greater than $Prob_e$, then the method 700 proceeds to step 750.

At step 750, the RWR system 100 reduces false associations by testing additional pulses (e.g., three or more). If the number of associated pulses is less than three, the method 700 proceeds to step 760 to test additional pulses. At step 760, another pulse (e.g., a third pulse) is tested in the same manner by defining a probability distribution thereof and returning to step 739. If no other pulse associates with the pair of pulses with, the association is removed by proceeding to step 745. If the association is verified with a third pulse, then the method 700 proceeds to step 755, where the pulses are associated. Thus, the false associations are reduced by repeating through steps 739, 740, 750, 760.

Figure 8:
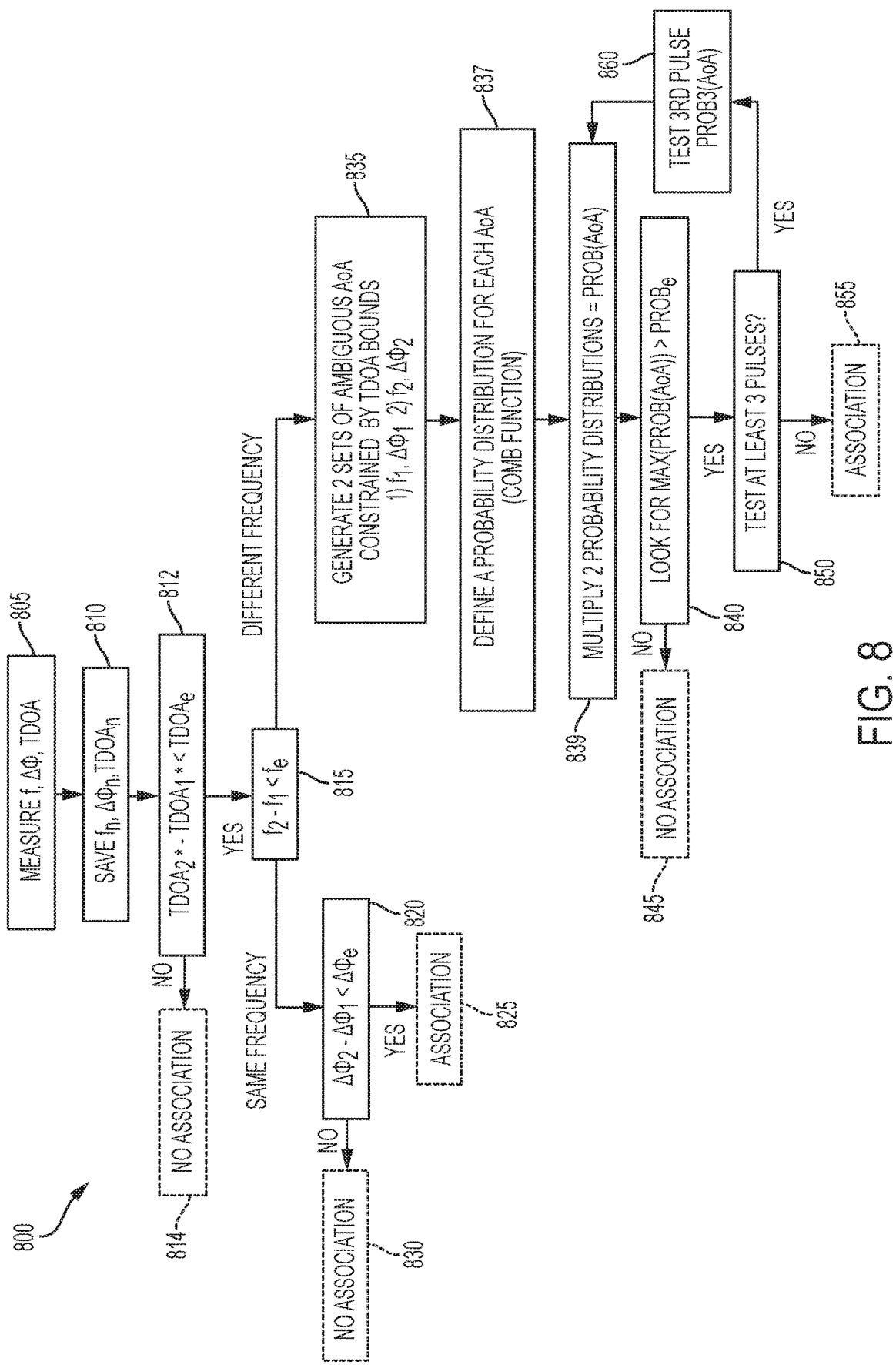
FIG. 8 is still another flow diagram of an exemplary method for improved association of pulses using multiple hypothesis in accordance with the subject technology.

Referring now to FIG. 8, a flow diagram illustrating still another method 800 of associating pulses based on ambiguous angle of arrival using the RWR system 100 is shown. Similar to methods 400, 600, 700, the method 800 is performed by the RWR system 100 and antenna elements 10a-d. The method 800 is very much a combination of the methods 600, 700. Again, for brevity, similar steps between method 800 and the other methods 400, 600, 700 disclosed herein are referenced with similar numbers so that the following description can largely focus in the distinctions between the methods. Steps 805, 810, 812, 814, 815, 820, 825, 830, 835 are basically the same as steps 605, 610, 612, 614, 615, 620, 625, 630, 635 of method 600 so that detailed discussion in this section is omitted. Steps 837, 839, 840, 845, 850, 855, 860 are basically the same as steps 737, 739, 740, 745, 750, 755, 760 of method 700 so that detailed discussion in this section is omitted.

Figure 9:
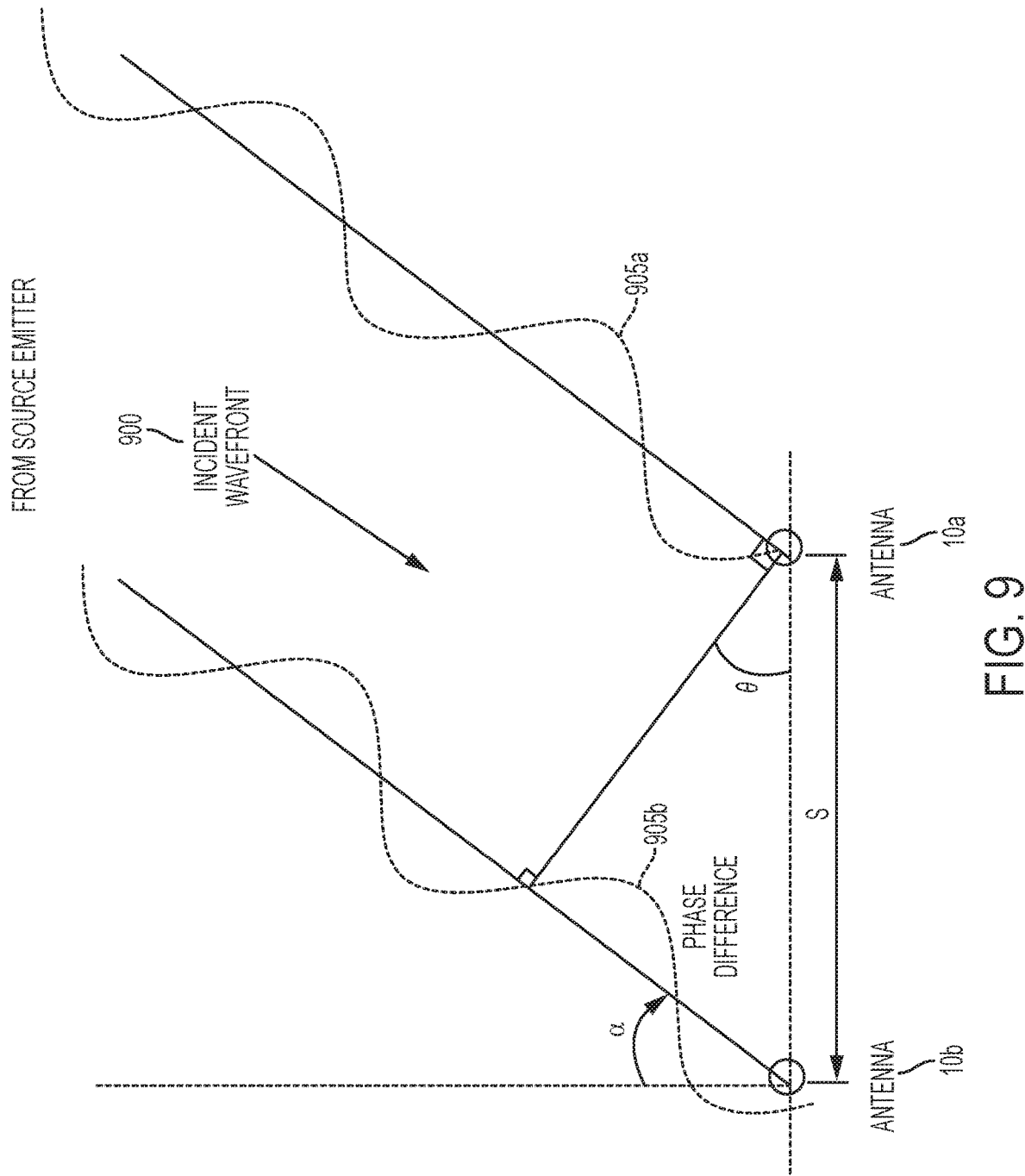
FIG. 9 illustrates the geometric relations among an incident RF signal wavefront from a source emitter and received at the antenna elements in accordance with the subject technology.

Referring now to FIG. 9, the geometric relations among an incident RF signal wavefront 900 from a source emitter and received at the antenna elements 10a, 10b are shown. The wavefront 900 includes a first signal component 905a and second signal component 905b. The path difference between the signal components 905a, 905b may be expressed as $d = s * \sin\theta$, where $\theta$ as shown comprise is the angle formed by a line drawn from the first antenna 10a normal to the signal path of the second signal component 905b. The time difference of arrival (TDOA) between the signal components 905a, 905b may be expressed as $$\Delta t = \frac{s * \sin\theta}{c},$$

where c is the speed of light. The phase difference of arrival may be given as $$\Delta\varphi = \frac{2\pi * s * \sin\theta}{\lambda}.$$

However the measured phase difference will be between 0 and $$2\pi, \Delta\varphi = \mod\left(\frac{2\pi * s * \sin\theta}{\lambda}, 2\pi\right).$$

is understood that TDOA and PI AoA measurements each contain uncertainty. With regard to TDOA error, the uncertainty is proportional to a time measurement error estimate associated with the measurement equipment, and may be empirically derived or may result from analysis of the equipment's design. The range of TDOA AoA solutions comprises a single solution plus or minus the associated error (which may have a Gaussian shape.) For example, the TDOA error is proportional to the baseline distance s and is roughly independent of pulse signal frequency, and may be expressed as $$\sigma_{\sin\theta} = \frac{c}{s} * \sigma_t.$$

The PI AoA solutions also contain an uncertainty due to phase measurement errors, which may be expressed by $$\sigma_{\sin\theta} = \frac{\lambda}{s}\left(\frac{\sigma_\varphi}{2\pi}\right).$$

However, the largest uncertainty of PI solutions is due to a modulo ($2\pi$) phase measurement error, which may be expressed by $$\Delta_{\sin\theta} = \frac{\lambda}{s}.$$

That is, the number of possibly correct AoA solutions resulting from PI direction finding techniques increases with signal carrier frequency (or goes inverse to signal wavelength) and increases with wider antenna baseline spacing. When s is wider than $$\frac{\lambda_{pulse}}{2},$$

the set of PI AoA estimates has approximately $$\frac{2s}{\lambda}$$

ambiguous results ("ambiguities") over the full hemisphere from −90° to 90° (or $\sin\theta$ from −1 to 1). If any other technique allows the angles to be constrained to $\pm\Delta\theta$ degrees; then the number of ambiguities can be reduced to $$\frac{2s}{\lambda}\frac{\Delta\theta}{90}.$$

All patents, patent applications and other references disclosed herein are hereby expressly incorporated in their entireties by reference.

Although the above disclosure discusses what is currently considered to be a variety of useful examples, one skilled in the art will realize the invention may be embodied in other specific forms without departing from the spirit or essential characteristics thereof. The foregoing embodiments are therefore to be considered in all respects illustrative rather than limiting of the inventions described herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An advance warning system for detecting threats to a tactical aircraft comprising:
    an antenna pair assembly mounted on the tactical aircraft including:
        an antenna pair including first and second antenna elements/receivers for detecting: a first signal/pulse related to a potential threat: the first signal/pulse being at a first wavelength and a first frequency, wherein the first and second antenna elements are spaced apart by more than one half of the first wavelength; a second signal/pulse at a second wavelength and a second frequency; and a third signal/pulse at a third wavelength and a third frequency;
    an RWR system in communication with the antenna pair assembly to receive the first, second and third signals/pulses, and configured to:
    compute a frequency ($f_n$) for the first, second and third signals/pulses;
    compute a phase difference ($\Delta\varphi_{diff}$) between the first and second antenna elements/receivers for the first and second signals/pulses;
    if the first and second frequency are within a threshold frequency difference ($f_e$) and the phase difference is less than a threshold phase difference ($\Delta\varphi_{diff}$), associate the second signal/pulse with the first signal/pulse;
    if the first and second frequency are not within a threshold frequency difference ($f_e$), generate a set of ambiguous angle of arrival AoA for the first and second signals/pulses based on the frequency and the phase difference of the first and second signals/pulses;
    correlate the two sets of ambiguous AoA to determine if there is a common AoA,
    if there is a common AoA, generate a third set of ambiguous angle of arrival AoA for the third signal/pulse based on the frequency and the phase difference of the third signal/pulse;
    correlate the three sets of ambiguous AoA to determine if there is a common AoA for all three signals/pulses; and
    if there is a common AoA for all three signals/pulses, associate all three signals/pulses.

2. An advance warning system as recited in claim 1, wherein to correlate the two sets of ambiguous AoA to determine if there is a common AoA, a common AoA is when a difference between the AoA for the first pulse/signal and the AoA for the second pulse/signal is below a user selected error threshold ($AoA_e$).

3. An advance warning system as recited in claim 1, wherein the RWR system is further configured to determine a difference ($TDOA_{diff}$) between a Time Difference of Arrival ($TDOA_2$) for the second pulse/signal and a Time Difference of Arrival ($TDOA_1$) for the first pulse/signal, wherein if $TDOA_{diff}$ is not less than a threshold TDOA difference ($TDOA_e$), no association of the first and second signals/pulses occurs.

4. An advance warning system as recited in claim 1, wherein to generate a set of ambiguous angle of arrival AoA for the first and second signals/pulses based on the frequency and the phase difference of the first and second signals/pulses, the sets are constrained by Time Difference of Arrival (TDOA) bounds.

5. An advance warning system as recited in claim 1, wherein to correlate the two sets of ambiguous AoA to determine if there is a common AoA, the RWR system:
    defines a probability distribution (Prob(AoA)) for each AoA of the first and second signals/pulses;
    multiplies the two probability distributions to yield a probability distribution product; and
    evaluates the probability distribution product to determine if the probability distribution product has any angles with joint probability greater than a probability distribution threshold $Prob_e$ to determine if there is a common AoA between the first and second signals/pulses.

6. An advance warning system as recited in claim 1, wherein the first signal is received from an RF emitter.

* * * * *